(12) United States Patent
Xu et al.

(10) Patent No.: US 12,464,465 B2
(45) Date of Patent: Nov. 4, 2025

(54) SCELL DORMANCY RELIABILITY IMPROVEMENT

(71) Applicant: Apple Inc., Cupertino, CA (US)

(72) Inventors: Fangli Xu, Beijing (CN); Dawei Zhang, Saratoga, CA (US); Haijing Hu, Los Gatos, CA (US); Longda Xing, San Jose, CA (US); Murtaza A. Shikari, Mountain View, CA (US); Sarma V. Vangala, Campbell, CA (US); Sethuraman Gurumoorthy, San Ramon, CA (US); Srirang A. Lovlekar, Fremont, CA (US); Yuqin Chen, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 471 days.

(21) Appl. No.: 17/995,378

(22) PCT Filed: Apr. 8, 2020

(86) PCT No.: PCT/CN2020/083822
§ 371 (c)(1),
(2) Date: Oct. 3, 2022

(87) PCT Pub. No.: WO2021/203324
PCT Pub. Date: Oct. 14, 2021

(65) Prior Publication Data
US 2023/0171701 A1    Jun. 1, 2023

(51) Int. Cl.
*H04W 52/02* (2009.01)
*H04W 72/23* (2023.01)
(52) U.S. Cl.
CPC ... *H04W 52/0274* (2013.01); *H04W 52/0232* (2013.01); *H04W 72/23* (2023.01)

(58) Field of Classification Search
CPC ......... H04W 52/0274; H04W 52/0232; H04W 72/23; H04W 52/0216; H04W 72/0453;
(Continued)

(56) References Cited

U.S. PATENT DOCUMENTS

| 2019/0020506 A1* | 1/2019 | Cheng | H04L 5/0053 |
| 2019/0103954 A1* | 4/2019 | Lee | H04L 5/0098 |

(Continued)

FOREIGN PATENT DOCUMENTS

| CN | 2019/077749 | 4/2019 |
| CN | 110536387 | 12/2019 |

(Continued)

OTHER PUBLICATIONS

ZTE Corporation, R1-1910109, "Discussion on low latency SCell activation", 3GPP TSG RAN WG1 Meeting #98bis, Chongqing, China, Aug. 14-20, 2019 (Year: 2019).*

(Continued)

*Primary Examiner* — Ayaz R Sheikh
*Assistant Examiner* — Tarell A Hampton
(74) *Attorney, Agent, or Firm* — Fay Kaplun & Marcin, LLP (57) ABSTRACT

The exemplary embodiments relate to a computer readable storage medium, a user equipment, a method and an integrated circuit that perform operations. A user equipment (UE) enters into a first state including one of a non-dormant state or a dormant state with a secondary serving cell (SCell) of a network, the SCell being configured to provide either one of a non-dormant bandwidth part (BWP) as a secondary component carrier (SCC) in the non-dormant state or a dormant BWP as an SCC in the dormant state. The UE switches from the first state to a second state including the
(Continued)

other one of the non-dormant state or the dormant state, the switch being based on network configuration, a dormancy timer, or a radio condition.

19 Claims, 9 Drawing Sheets

(58) Field of Classification Search
CPC .... H04W 72/1263; H04L 1/0009; H04L 1/08; H04L 5/0098; H04L 5/001; Y02D 30/70
See application file for complete search history.

(56) References Cited

U.S. PATENT DOCUMENTS

| | | | | |
|---|---|---|---|---|
| 2020/0092814 A1* | 3/2020 | Zhou | .................. | H04W 52/0235 |
| 2021/0105722 A1* | 4/2021 | Tsai | .................. | H04W 52/0229 |
| 2021/0377852 A1* | 12/2021 | Zhou | .................. | H04W 52/0235 |
| 2021/0392651 A1* | 12/2021 | Futaki | .................... | H04W 24/10 |
| 2022/0312470 A1* | 9/2022 | Seo | ........................ | H04L 5/0055 |
| 2022/0330378 A1* | 10/2022 | Seo | ..................... | H04W 72/044 |
| 2023/0171688 A1* | 6/2023 | Xu | ........................ | H04W 76/28 370/311 |
| 2025/0048257 A1* | 2/2025 | Zhou | ................. | H04W 52/0206 |

FOREIGN PATENT DOCUMENTS

| | | | |
|---|---|---|---|
| CN | 110830216 | 2/2020 | |
| WO | WO-2021087657 A1 * | 5/2021 | ........ H04W 52/0206 |

OTHER PUBLICATIONS

CATT, R1-1910325, "Triggering of SCell dormancy", 3GPP TSG RAN WG1 Meeting #98bis, Chongqing, China, Oct. 14-20, 2019 (Year: 2019).*
LG Electronics, R1-1910838, "Discussion on L1 based Scell dormancy", 3GPP TSG RAN WG1 Meeting #98bis, Chongqing, China, Oct. 14-20, 2019. (Year: 2019).*
Qualcomm Incorporated, R1-1911139, "Fast SCell Activation and SCell Dormancy", 3GPP TSG-RAN WG1 #98bis, Chongqing, China, Oct. 14-20, 2019 (Year: 2019).*
ZTE Corporation, Discussion on low latency SCell activation', 3GPP TSG RAN WG1 Meeting #98bis, R1-1910109, Aug. 20, 2019, 7 sheets.
ZTE Corporation, On SCell dormancy behavior, 3GPP TSG RAN WG2 Meeting #108, R2-1914822, Nov. 22, 2019, 4 sheets.
OPPO, "Email report of [AT109E][046][DCCA] Fast SCell Activation", 3GPP TSG RAN WG2 Meeting #109e, R2-2002224, Mar. 6, 2020, 31 sheets.

* cited by examiner

SCELL DORMANCY RELIABILITY IMPROVEMENT

BACKGROUND INFORMATION

A user equipment (UE) may be configured with a variety of different capabilities. For example, the UE may be capable of establishing a connection with a network. In one example, the UE may connect to a 5G New Radio (NR) network. While connected to the 5G NR network, the UE may utilize capabilities associated with the network. For example, the UE may utilize a carrier aggregation (CA) functionality in which a primary component carrier (PCC) and at least one secondary component carrier (SCC) are used to communicate data over the various LTE bands. The network component to which the UE has connected may be a next generation evolved Node B (gNB) that provides the PCC. The connected gNB may also control how the carrier aggregation is to be utilized with the SCCs. For example, the gNB may request measurements for other cells and/or bands that may serve as SCCs and receive the measurements to determine how the available bands are to be used in the carrier aggregation functionality.

5G NR introduced the concept of bandwidth parts (BWP) because the bandwidth supported by 5G NR networks is very large compared to legacy networks. As part of the concept of BWP, there may be dormant BWPs. In one type of the CA functionality, a dormant BWP may be configured for a secondary serving cell (SCell) to enable fast SCell activation. A UE configured with a dormant BWP as an SCC may perform reduced functionalities for the SCC relative to an active BWP serving as an SCC. The network may signal the UE to enter/exit a dormant BWP based on network or UE considerations.

SUMMARY

In an exemplary embodiment, a computer readable storage medium comprises a set of instructions, wherein the set of instructions when executed by a processor of a user equipment (UE) cause the processor to perform operations including entering into a first state including one of a non-dormant state or a dormant state with a secondary serving cell (SCell) of a network, the SCell being configured to provide either one of a non-dormant bandwidth part (BWP) as a secondary component carrier (SCC) in the non-dormant state or a dormant BWP as an SCC in the dormant state. The operations further comprise switching from the first state to a second state including the other one of the non-dormant state or the dormant state, the switch being based on network configuration, a dormancy tinier, or a radio condition.

In a further exemplary embodiment, a user equipment (UE) includes a transceiver configured to be served a secondary component carrier (SCC) by a secondary serving cell (SCell) configured to provide either one of a non-dormant bandwidth part (BWP) as the SCC in a non-dormant state or a dormant BWP as the SCC in a dormant state. The UE further includes a processor configured to enter into a first state including one of the dormant state or the non-dormant state and switch from the first state to a second state including the other one of the non-dormant state or the dormant state, the switch being based on network configuration, a dormancy timer, or a radio condition.

DETAILED DESCRIPTION

The exemplary embodiments may be further understood with reference to the following description and the related appended drawings, wherein like elements are provided with the same reference numerals. The exemplary embodiments describe mechanisms for managing secondary serving cell (SCell) dormancy for a UE in a multi-cell carrier aggregation (CA) configuration comprising a primary serving cell (PCell) and at least one SCell.

The exemplary embodiments are described with regard to carrier aggregation performed at a 5G NR network and with SCell dormancy configured. However, the use of the 5G NR network is only exemplary. The exemplary embodiments may be modified and/or used with any network that supports carrier aggregation (CA) or a substantially similar functionality in which a plurality of component carriers (CCs) is used, as well as any functionality that utilizes a dormant bandwidth part (BWP) on the SCell. For example, a legacy network such as LTE supports CA functionalities and the exemplary embodiments may be used with such a network.

CA may include a primary component carrier (PCC) and at least one secondary component carrier (SCC) that correspond to the same radio access technology (RAT) being used to facilitate communication with the network. In addition, in 5G NR, Eutra NR Dual Connectivity (ENDC) may be enabled where a connection is established with both the 5G NR RAT and the LTE RAT, and the exemplary embodiments may be used. The PCC may be used, in part, for control information such as scheduling requests, uplink grants, downlink grants, etc. CA functionality enables the PCC and at least one SCC to combine bandwidths to exchange data with the UE. Thus, with CA, the PCC may provide a first portion of a total bandwidth for data to be exchanged while the SCC may provide a second portion of the total bandwidth. The combination of a PCC and a single SCC may be characterized as a CC combination that includes two carriers. To further increase the total available bandwidth for data to be exchanged with the UE, additional SCCs may be incorporated. For example, with CA for LTE, there may be CC combinations that include, but are not limited to, two carriers, four carriers, five carriers, eight carriers, ten carriers, thirty-two carriers, etc. With CA for 5G NR there may be CC combinations that include, but are not limited to, two carriers, five carriers, ten carriers, twelve carriers, sixteen carriers, twenty carriers, twenty-five carriers, thirty-two carriers, sixty-four carriers, etc.

The exemplary system may be configured with CA functionality and comprise a PCell providing a PCC and at least one SCell respectively providing an SCC. The PCell may control how data is exchanged with the UE, such as how the PCC and any SCCs are to be used in the CA functionality. When the UE is CA capable, the CA functionality enables the PCell and a further SCell to combine bandwidths to exchange data with the UE to increase a rate of data exchange. Thus, with CA, the PCell may provide a first portion of a total bandwidth for data to be exchanged while the SCell may provide a second portion of the total bandwidth. When further SCells are used, the PCell may provide the first portion of the total bandwidth, the first SCell may provide the second portion of the total bandwidth, a second Scell may provide a third portion of the total bandwidth, and so on.

A dormant bandwidth part (BWP) may be configured for an SCell to enable fast SCell activation. With regard to a particular SCell, a UE and the SCell may be configured in a non-dormant (activated) state, a dormant (activated) state and a deactivated state relative to the connection therebetween. In the non-dormant activated state, the UE may be configured for 1) monitoring of the physical downlink control channel (PDCCH), 2) transmission of sounding reference signals (SRSs), a radio access channel (RACH), a physical uplink shared channel (PUSCH) and a physical downlink shared channel (PDSCH), 3) beam management and CSI measurement, and 4) automatic gain control (AGC). In the dormant state, the UE may be configured for 3) beam management and CSI measurement and 4) AGC, but not for 1) PDCCH monitoring or 2) transmission as described above. In the deactivated state, the UE is not configured for any of the functions 1)-4) described above. It is further noted that periodic CSI reporting is supported in the dormant state, but aperiodic CSI reporting is not supported.

As will be described in further detail below, the exemplary embodiments may utilize downlink control information (DCI) generated by the PCell and provided to the UE and/or the SCell. Those skilled in the art will understand that the DCI may be a feature associated with the 5G NR network. However, the exemplary embodiments may utilize any control mechanism that has the characteristics as described herein to provide the features of the DCI in managing the dormant state.

The UE may be configured to switch into and out of the dormant state for the SCell via a Layer 1 (L1) DCI signaled by the network. When the UE is configured in a CA functionality with the SCell, the UE may be in either of the non-dormant state and the dormant state with respect to the SCell and may monitor the SCell for the dormancy DCI. If the UE receives the dormancy DCI to indicate the SCell entering dormancy, the UE will switch to the dormant BWP, and if the UE receives the L1 DCI to indicate the SCell leaving dormancy, the UE will switch to an active BWP at the SCell. Those skilled in the art will understand that the L1 DCI is a wake-up signal (WUS) type message that may be used to wake up the UE with respect to the SCell when the UE is in the DRX off state. For example, if the UE is in the DRX-off state, the UE will switch to the firstOutsideActiveTimeBWP and if the UE is in the DRX-on state the UE will switch to the firstWithinActiveTimeBWP.

Issues may arise in the above-described dormancy configuration when the dormancy DCI is not detected by the UE. When the dormancy DCI is mis-detected, the UE will determine that the present state in which the UE is configured should be maintained and will not switch to the dormant BWP or the non-dormant BWP as expected by the network.

Figure 4:
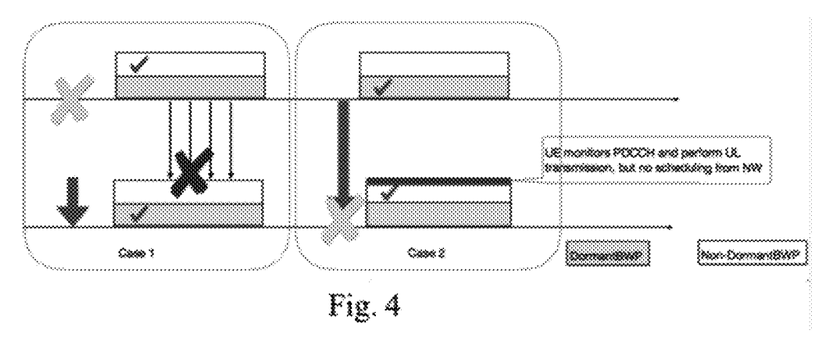
FIG. 4 shows a diagram that may arise when a dormancy DCI is mis-detected by a UE.

In a first case, as shown in FIG. 4, a UE presently configured with an SCell providing a dormant BWP as an SCC does not detect the DCI indicating the SCell is entering the non-dormant state and that the UE should switch to the non-dormant BWP. In such an example, the UE will assume a DCI was received indicating the SCell is in the dormant state with regard to the CA connection and will remain configured with the dormant BWP. Accordingly, the UE will lose network scheduling and the network may regard the UE SCell connection quality as bad or broken.

In a second case, as shown in FIG. 4, a UE presently configured with an SCell providing a non-dormant BWP as an SCC does not detect the DCI indicating the SCell is entering the dormant state and that the UE should switch to the dormant BWP. In such an example, the UE will assume a DCI was received indicating the SCell is in the non-dormant state with regard to the CA connection and will remain configured for the non-dormant state. Accordingly, the UE will keep monitoring the PDCCH but will not receive scheduling therefrom, which will increase UE power usage. The UE will continue uplink transmission on the non-dormant BWP, which is not expected by the network, and may lead to UL interference with other UEs if the network allocates the same resource to the other UE.

According to the exemplary embodiments, various mechanisms are provided to obviate the aforementioned issues. In general, the mechanisms may comprise explicit network configuration of the dormant/non-dormant state, an implementation of a dormancy timer, DCI transmission repetition, and/or a radio quality determination for the connection between the UE and the SCell.

Figure 1:
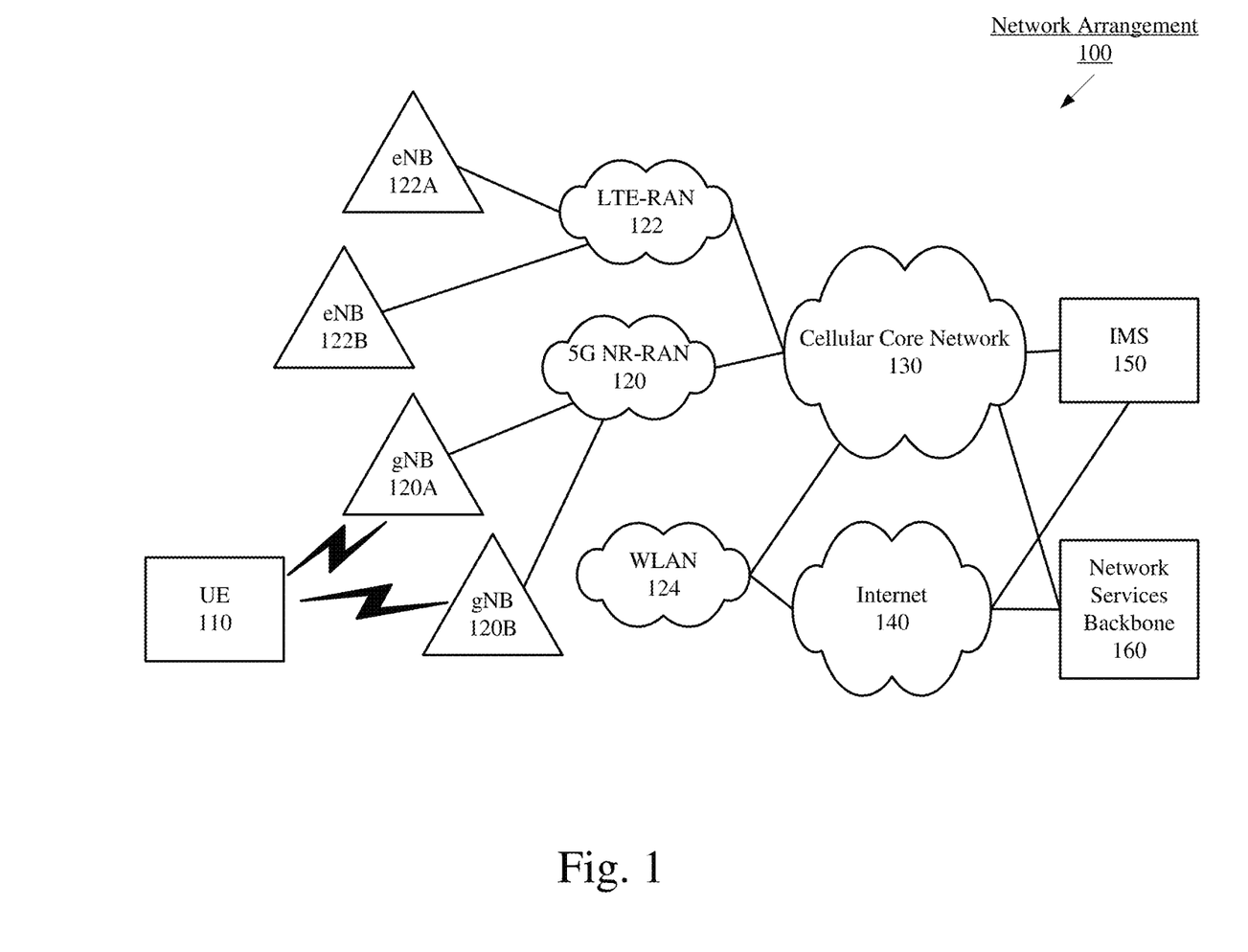
FIG. 1 shows an exemplary network arrangement according to various exemplary embodiments.

FIG. 1 shows an exemplary network arrangement 100 according to various exemplary embodiments. The exemplary network arrangement 100 includes a UE 110. Those skilled in the art will understand that the UE may be any type of electronic component that is configured to communicate via a network, e.g., a component of a connected car, a mobile phone, a tablet computer, a smartphone, a phablet, an embedded device, a wearable, an Internet of Things (IoT) device, etc. It should also be understood that an actual network arrangement may include any number of UEs being used by any number of users. Thus, the example of a single UE 110 is merely provided for illustrative purposes.

The UE 110 may communicate directly with one or more networks. In the example of the network configuration 100, the networks with which the UE 110 may wirelessly communicate are a 5G NR radio access network (5G NR-RAN) 120, an LTE radio access network (LTE-RAN) 122 and a wireless local access network (WLAN) 124. Therefore, the UE 110 may include a 5G NR chipset to communicate with the 5G NR-RAN 120, an LTE chipset to communicate with the LTE-RAN 122 and an ISM chipset to communicate with the WLAN 124. However, the UE 110 may also communicate with other types of networks (e.g. legacy cellular networks) and the UE 110 may also communicate with networks over a wired connection. With regard to the exemplary embodiments, the UE 110 may establish a connection with the 5G NR-RAN 122 and/or the LTE-RAN 120.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells and/or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN via at least one of the next generation nodeB (gNB) 120A and/or the gNB 120B. The gNBs 120A, 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to two gNB 120A, 120B is merely for illustrative purposes. The exemplary embodiments may apply to any appropriate number of gNBs. Specifically, the UE 110 may simultaneously connect to and exchange data with a plurality of gNBs 120A, 120B in a multi-cell CA configuration as described above. The UE 110 may also connect to the LTE-RAN 122 via either or both of the eNBs 122A, 122B, or to any other type of RAN, as mentioned above.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
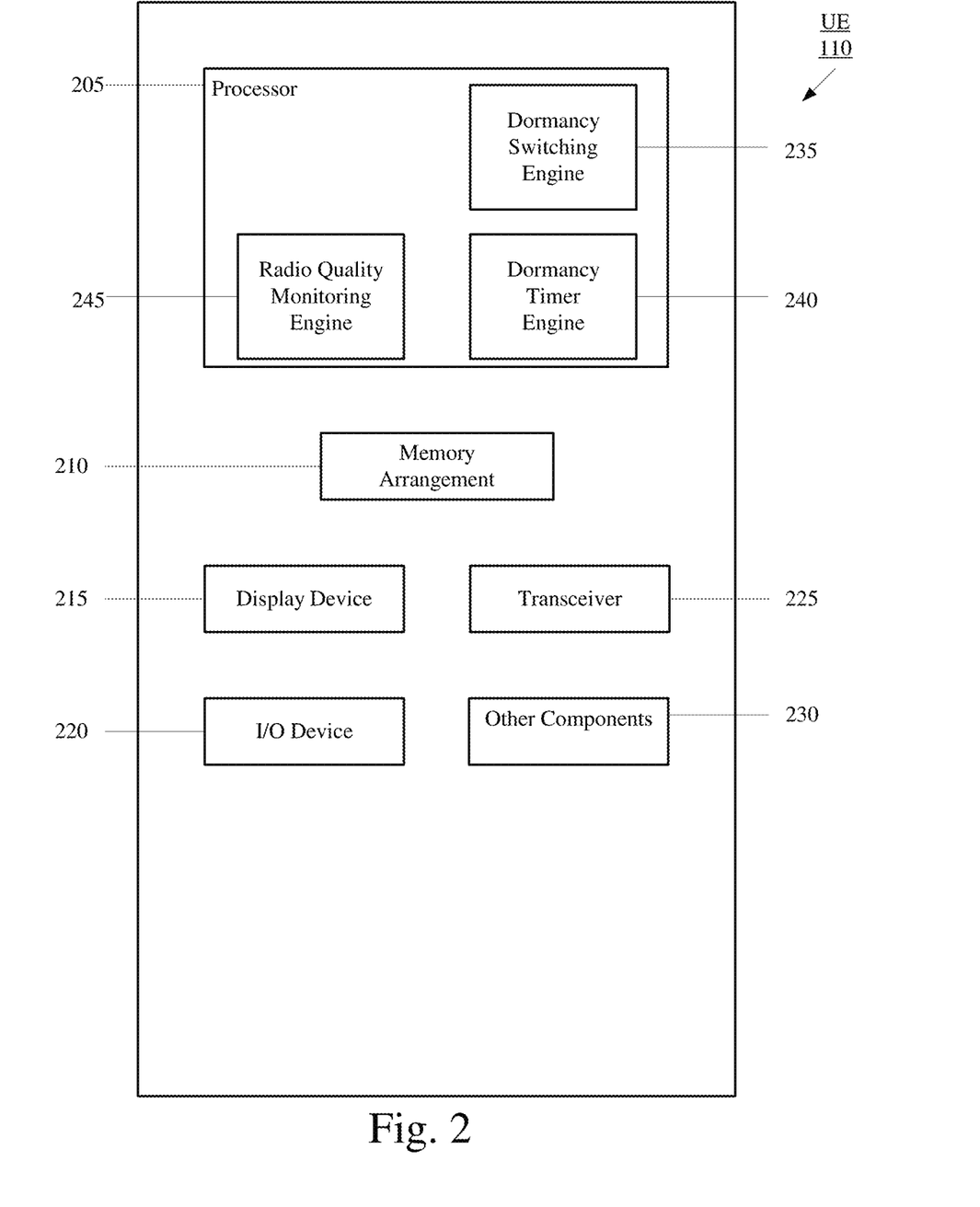
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include a dormancy switching engine 235, a dormancy timer engine 240 and radio quality monitoring engine 245. The dormancy engine 235 may be configured for switching between a dormant BWP and a non-dormant BWP based on various configurations and trigger conditions, to be described below. For example, the UE 110 may switch from one of the two states to the other one of the two states based on an explicit network configuration, a detection of a DCI, a radio quality, etc. The dormancy timer engine 245 may be configured for initiating a dormancy timer that, upon expiration, cause the UE to switch to/from the dormant/non-dormant BWP. The radio quality monitoring engine 245 may be configured for determining whether a radio quality with the SCell is good or bad, and switching or maintaining a current dormancy state based in part on the determination. In some embodiments, the UE 110 may comprise multiple ones or all of the aforementioned engines, while in other embodiments the UE 110 may comprise a single one of the aforementioned engines.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE. The memory 210 may be a hardware component configured to store data related to operations performed by the UE 110.

The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the LTE-RAN 120, the 5G NR-RAN 122 etc. Accordingly, the transceiver 225 may operate on a variety of different frequencies or channels (e.g., set of consecutive frequencies).

Using the CA functionality, the gNB 120A may serve as the PCell while the gNB 120B may serve as at least one of the SCells. The SCells may also be, for example, small cells. The exemplary embodiments will be described relative to a network configuration with a PCell and a single SCell, however, as mentioned above, multiple SCells may be used in CA.

Figure 3:
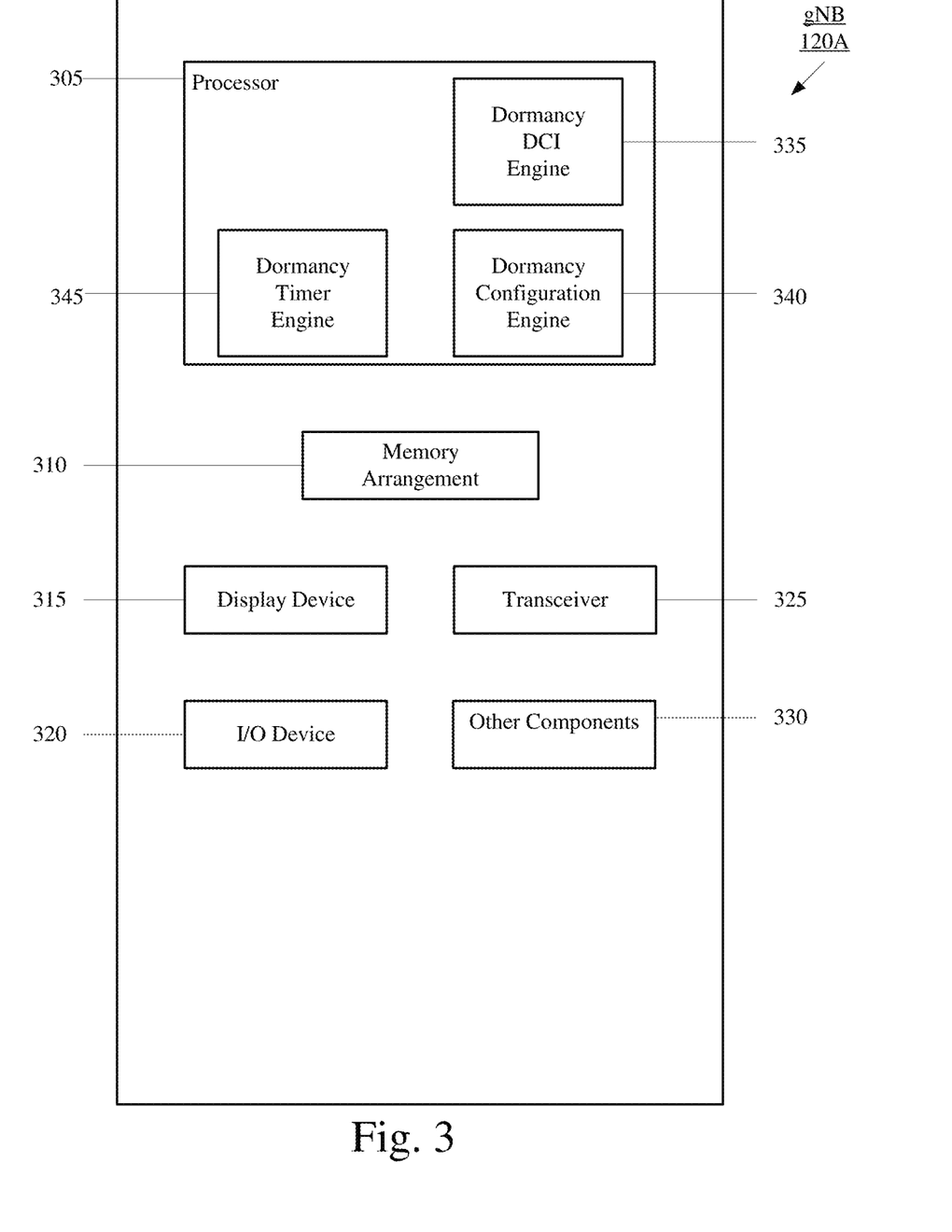
FIG. 3 shows an exemplary network cell according to various exemplary embodiments.

FIG. 3 shows an exemplary network cell, in this case gNB 120A, according to various exemplary embodiments. The gNB 120B may be configured in a substantially similar manner. In the following, the gNB 120A is described as the PCell and the gNB 120B is described as the SCell in a CA configuration. However, as would be known to a person skilled in the art, either of the gNB 120A and the gNB 120B may serve as a PCell and/or an SCell in other network configurations. The gNB 120A may represent any access node of the 5G NR network through which the UE 110 may establish a connection and manage network operations.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include a dormancy DCI engine 335, a dormancy configuration engine 340, and a dormancy timer engine 345. The dormancy DCI engine 335 may be configured to cause the gNB 120A to transmit a dormancy DCI to the UE 110 to initiate a switch from a dormant/non-dormant state to the other of the two states. The dormancy DCI engine 335 may, in some embodiments, be further configured to repeat a dormancy DCI a predetermined number of times for a given time frame, to be described further below. The dormancy configuration engine 340 may be configured to cause the gNB 120A to explicitly configure a dormancy state for the UE. For example, the gNB 120A may explicitly configure the working BWP for the UE, may link SCell dormancy operation with a DRX onduration state of the UE, etc. In another example, the gNB 120A may configure radio quality parameters for the UE 110 so that the UE 110 may switch into or out of the dormant state based on radio quality considerations. The dormancy timer engine 345 may be configured to cause the gNB 120A to configure a dormancy timer for the UE 110. Similar to the UE 110 described above, the gNB 120A may comprise multiple ones or all of the aforementioned engines, while in other embodiments the gNB 120A may comprise a single one of the aforementioned engines.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of an gNB.

The memory 310 may be a hardware component configured to store data related to operations performed by the UE 110. The I/O device 320 may be a hardware component or ports that enable a user to interact with the gNB 120A. The transceiver 325 may be a hardware component configured to exchange data with the UE 110 and any other UE in the system 100, e.g. if the gNB 120A serves as a PCell or an SCell to the UE 110. The transceiver 325 may operate on a variety of different frequencies or channels (e.g., set of consecutive frequencies). When serving as the PCell, the transceiver 325 may operate on licensed channels/bandwidths to communicate with the corresponding UE. When serving as the SCell, the transceiver 225 may operate on licensed channels/bandwidths to communicate with the corresponding UE via a conventional CA functionality or unlicensed bandwidths to communicate with the corresponding UE via licensed assisted access (LAA) functionality. Therefore, the transceiver 325 may include one or more components (e.g., radios) to enable the data exchange with the various networks and UEs.

As described above, the gNB 120A may serve as the PCell for the UE 110. Thus, any management of channels/bandwidths used in the CA functionality may be performed by the gNB 120A. This management functionality extends to the management of the dormant state of an SCell used in a CA configuration, as will be described below. In the following, certain mechanisms may be described as being implemented by the network, however, those skilled in the art will understand that the network-implemented functionalities for a CA configuration are generally initiated by the PCell, as mentioned above.

As noted previously, the current DCI signaling arrangement for changing an SCell dormancy state may cause adverse effects to the network and the UE when a DCI signal from the network is mis-detected by the UE. Various mechanism as described below may be employed to improve the configuration of SCell dormancy.

Figure 5:
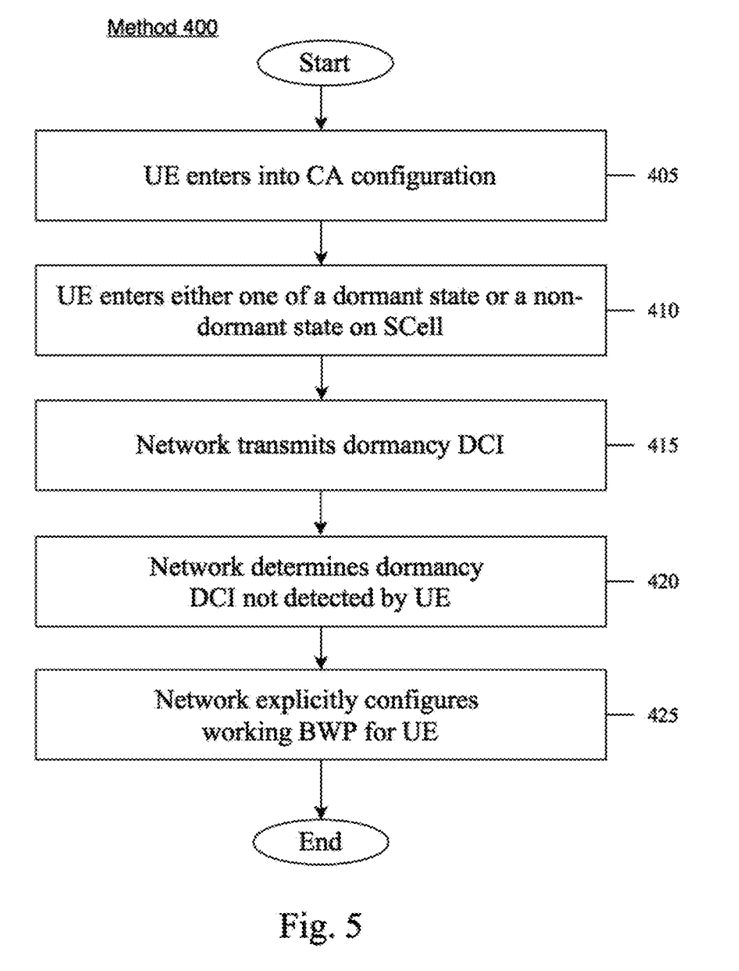
FIG. 5 shows a method for configuring a dormancy state for a UE in a carrier aggregation (CA) configuration with an SCell according to a first exemplary embodiment.

In the first exemplary embodiment described below, the network, via a PCell, e.g. gNB 120A, explicitly configures the working BWP for the UE when the UE does not detect an L1 dormancy DCI FIG. 5 shows a method 400 for configuring a dormancy state for a UE in a carrier aggregation (CA) configuration with an SCell according to a first exemplary embodiment. In 405, the UE, e.g. UE 110, enters into a CA configuration with a primary serving cell (PCell), e.g. gNB 120A, providing a primary component carrier (PCC) and at least one secondary serving cell (SCell), e.g. gNB 120B, providing a secondary component carrier (SCC), the at least one SCell being configured with a dormant bandwidth part (BWP) available as an SCC.

In 410, the UE enters either one of a dormant active state or a non-dormant active state on the SCell. As described above, the SCell has active BWPs available for connection and at least one dormant BWP. In the dormant active state the UE is configured with the dormant BWP as an SCC and has reduced functionalities with regard to the SCell. In the non-dormant active state the UE is configured with an active BWP as an SCC and has full functionalities with regard to the SCell.

In 415, the network transmits a downlink (DL) control indicator (DCI) to configure the UE with the other one of the dormant state and the non-dormant state with regard to the SCell than the currently configured state, e.g. transmits a dormancy DCI to configure the UE with the dormant state or transmits a wake-up DCI to configure the UE with the non-dormant state.

In 420, the network optionally determines the UE did not detect the DCI. For example, if the UE detects the dormancy DCI is missing, the UE may report it to the network. If the network does not provide the dormancy DCI in a reliable configuration, the method may proceed directly to 425.

In 425, optionally based on the determination that the UE did not properly detect the DCI, the network explicitly configures the working BWP for the UE. The UE may do so in at least the following manners. In a first example, the network, via the network cell, configures the BWP ID explicitly, e.g., provides the UE with the exact identification of the BWP. In a second example, the network, via the network cell, can configure 1 bit to indicate "dormant" or "non-dormant." When the UE receives the "dormant" indication, the UE enters a dormant state with the SCell and works on the dormant BWP, and when the UE receives the "non-dormant" indication, the UE enters a non-dormant state with the SCell and works on the first active BWP available.

Figure 6:
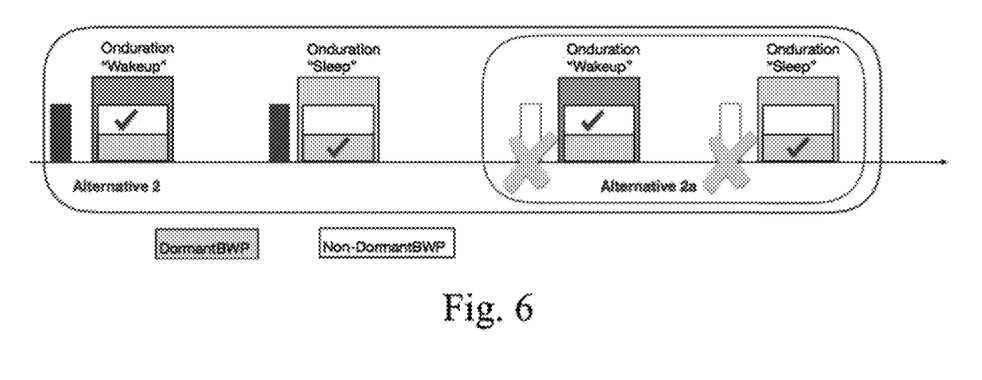
FIG. 6 shows a diagram of the dormancy state switching based on explicit network configuration of FIG. 5

In a third example, the network configures the UE to link SCell dormancy operation with a DRX Onduration state, as shown in FIG. 6. For example, the UE is configured to switch the SCell BWP to the dormant BWP during the "sleep" Onduration and to switch the SCell BWP to the non-dormant BWP during the "wakeup" Onduration.

In further exemplary embodiments, an SCell dormancy mechanism is configured by the network upon establishment of the connection with the SCell having a dormant BWP, e.g. not only when the trigger condition is determined of no WUS DCI reception at the UE. For example, for the third example described above, the SCell dormancy may be linked to the DRX onduration state, as discussed above, upon establishment of the connection, e.g. the mechanism is in use at all times during the UE connection with the SCell.

Various other mechanisms may be utilized at all times, e.g. without utilizing an initial DCI signal that may or may not be detected properly, as described below.

Figure 7:
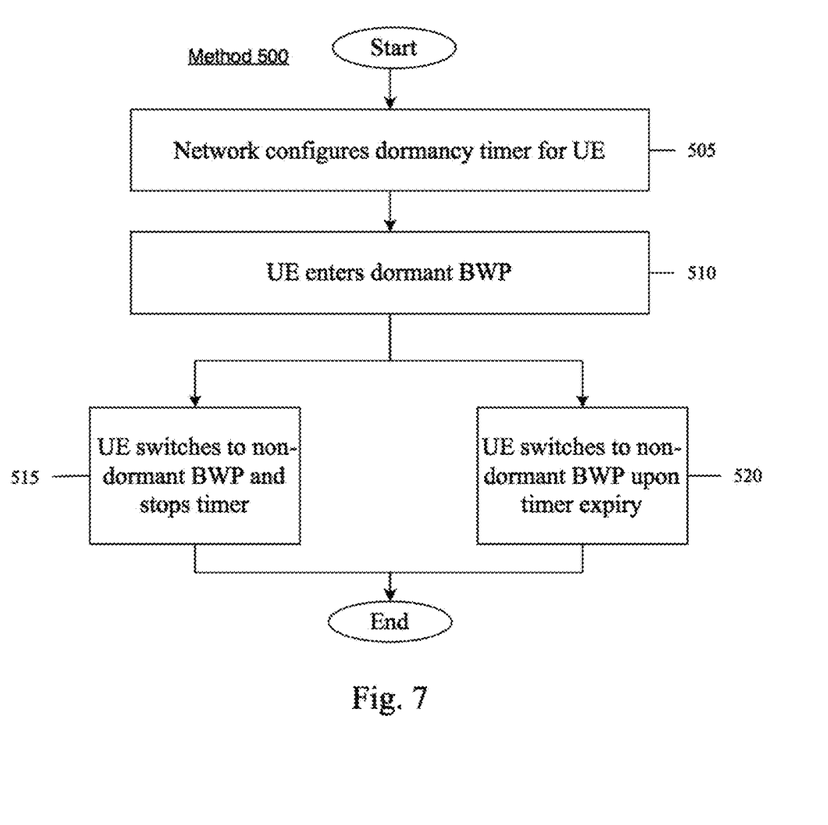
FIG. 7 shows a method for configuring a dormancy state for a UE in a carrier aggregation (CA) configuration with an SCell based on a dormancy timer according to a second exemplary embodiment.

FIG. 7 shows a method 500 for configuring a dormancy state for a UE in a carrier aggregation (CA) configuration with an SCell based on a dormancy timer according to a second exemplary embodiment. In 505, the network configures a timer for a UE, e.g. UE 110, comprising a max dormant period for a connection with an SCell, e.g. gNB 120B. The network may configure the UE via a PCell, e.g. gNB 120A, or an SCell, e.g. gNB 120. The configuration and maintenance of the timer may be per SCell, per SCell group, or per UE. Thus, the timer may be configured for the UE based on the configuration for the SCell to which it connects, or it may be configured at all times for the UE when it is connected to any SCell.

Figure 8:
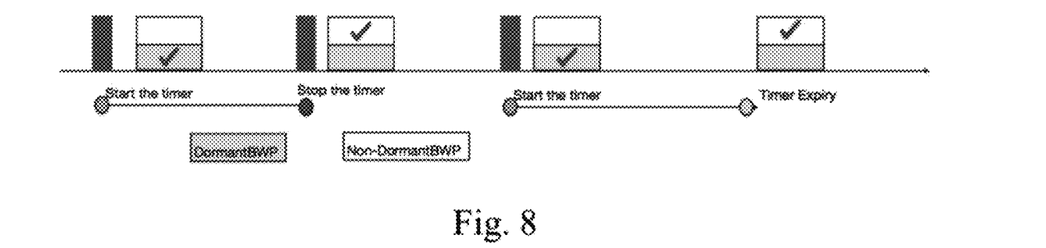
FIG. 8 shows a diagram of the dormancy state switching based on a dormancy timer of FIG. 7.

In 510, the UE enters the dormant BWP on the SCell and starts the timer. The UE may switch out of the dormant BWP in either of the two following ways. In a first scenario, in 515, the UE switches out of the dormant BWP and to an active BWP in an alternate way unrelated to the timer, e.g. by detecting a dormancy DCI as discussed above. In such a scenario, the UE stops the timer when the UE switches out of the dormant BWP. In a second scenario, in 520, the timer expires and the UE switches out of the dormant BWP and to an active BWP upon timer expiry, as shown in FIG. 8. FIG. 8 shows a diagram of both of the aforementioned scenarios, i.e. the first scenario where the UE switches from the dormant BWP to the active BWP based on an alternate way unrelated to the timer, and the second scenario where the timer expires and the UE switches from the dormant BWP to the active BWP upon timer expiry.

Figure 9:
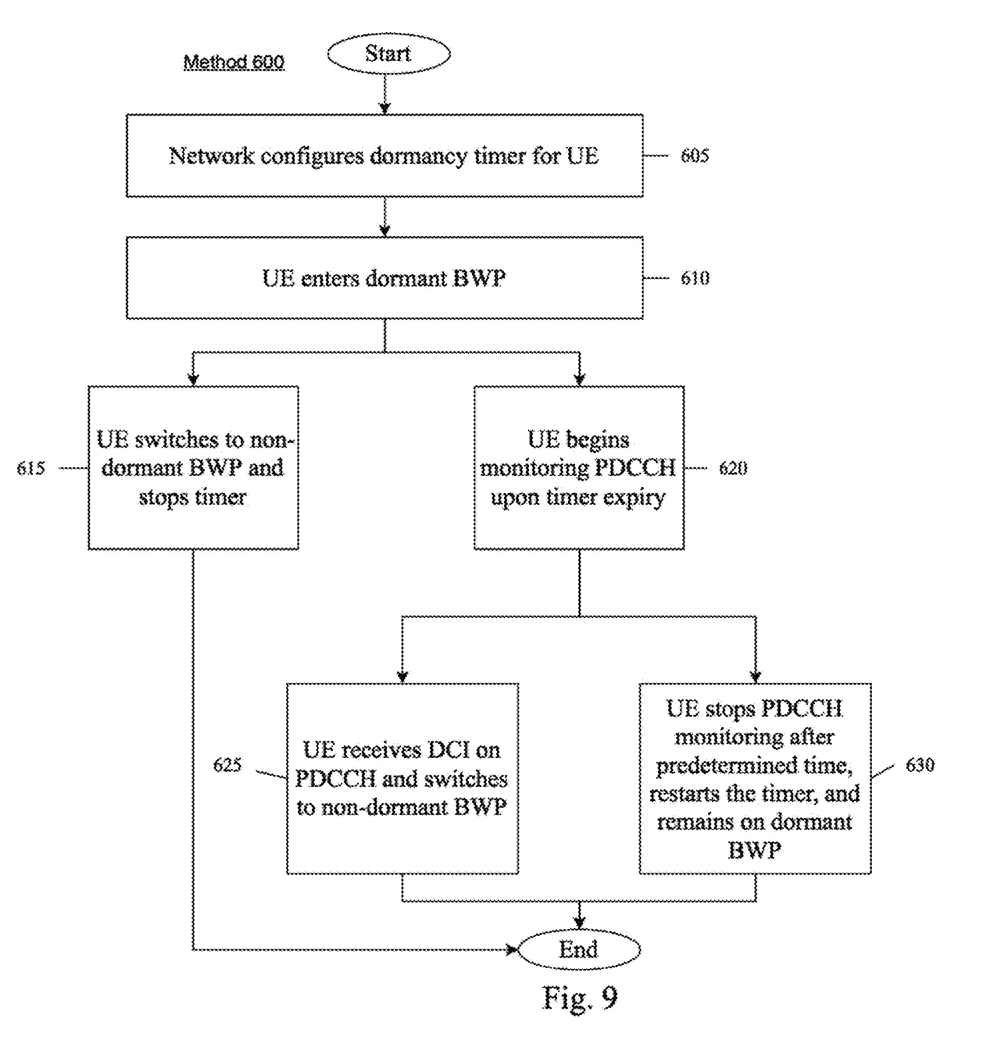
FIG. 9 shows a method for configuring a dormancy state for a UE in a carrier aggregation (CA) configuration with an SCell based on a dormancy timer according to a third exemplary embodiment.

FIG. 9 shows a method 600 for configuring a dormancy state for a UE in a carrier aggregation (CA) configuration with an SCell based on a dormancy timer according to a third exemplary embodiment. The method 600 comprises steps 605-615 that may be substantially similar to steps 505-515 discussed above with regard to the method 500. However, in this alternate embodiment, rather than immediately switching out of the dormant BWP upon timer expiry, in 620, the UE begins monitoring the corresponding PDCCH on the scheduling Scell upon timer expiry.

Figure 10:
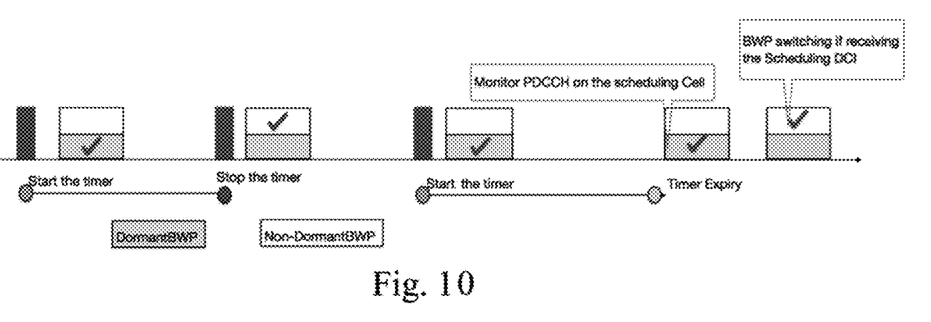
FIG. 10 shows a diagram of the dormancy state switching based on the dormancy timer of FIG. 9.

In 625, if the UE receives a scheduling DCI on the PDCCH indicating a non-dormant BWP, the UE switches to the non-dormant BWP. If, after a predetermined amount of monitoring time, the UE does not receive a scheduling DCI on the PDCCH, in 630 the UE restarts the timer and stops PDCCH monitoring, as shown in FIG. 10. FIG. 10 shows a diagram including the first scenario discussed above with regard to the method 700, where the UE switches from the dormant BWP to the active BWP based on an alternate way unrelated to the timer, and the second scenario describing the embodiment of the method 900, where the timer expires and the UE monitors the PDCCH. When the UE receives the scheduling DCI on the PDCCH the UE switches to the non-dormant BWP.

Figure 11:
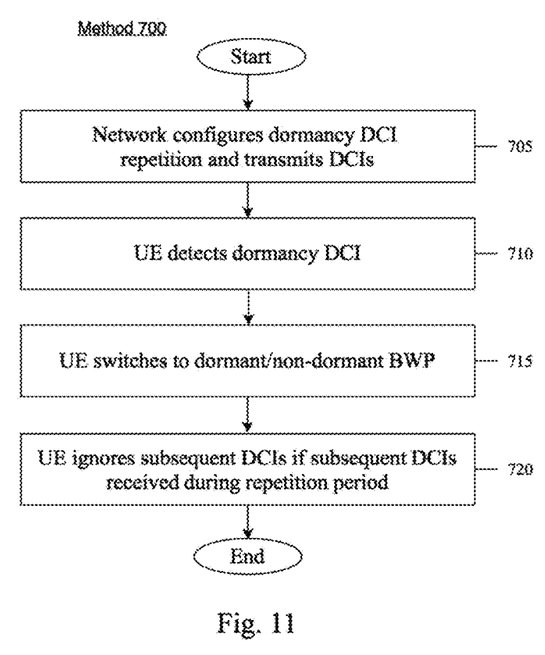
FIG. 11 shows a method for configuring a dormancy state for a UE in a carrier aggregation (CA) configuration with an SCell based on a DCI repetition scheme according to a fourth exemplary embodiment.

FIG. 11 shows a method 700 for configuring a dormancy state for a UE in a carrier aggregation (CA) configuration with an SCell based on a DCI repetition scheme according to a fourth exemplary embodiment. In 705, the network, via a PCell, e.g. gNB 120A, configures a dormancy DCI (e.g., to enter the dormant state or the non-dormant active state) to be sent to the UE multiple times, e.g. N times, for both DRX-off and DRX-on periods. For example, the dormancy DCI may be sent 4 times in rapid succession each period.

In 710, the UE detects one of the N DCIs transmitted by the network. In 715, the UE follows the command and switches from/to the active/dormant BWP to the other BWP. If, in 710, the UE detected a DCI earlier than the last DCI transmitted, e.g., the UE detects the first, second or third DCI of a four DCI repetition scheme, the UE, in 720, ignores the subsequently sent DCI(s) during the repetition period.

Figure 12:
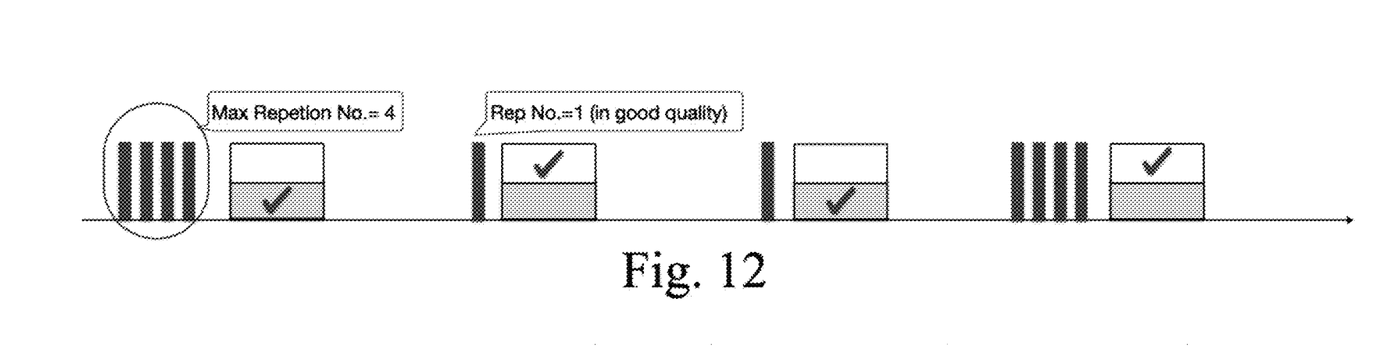
FIG. 12 shows a diagram of the dormancy state switching based on the DCI repetition scheme of FIG. 11.

In an alternate embodiment, the network may configure the DCI repetition to be dependent on the quality of the connection with the PCell. For example, if the network determines the radio quality is good, the network may reduce the number of DCI transmission to a lower number of repetitions or to no repetitions, as shown in FIG. 12. FIG. 12 shows a diagram including a first period of DCI repetition when channel quality is determined to be bad, a second and third period of reduced DCI transmission, i.e. reduced to a single transmission, when the channel quality is determined to be good, and a fourth period of DCI repetition when channel quality is again determined to be bad.

Figure 13:
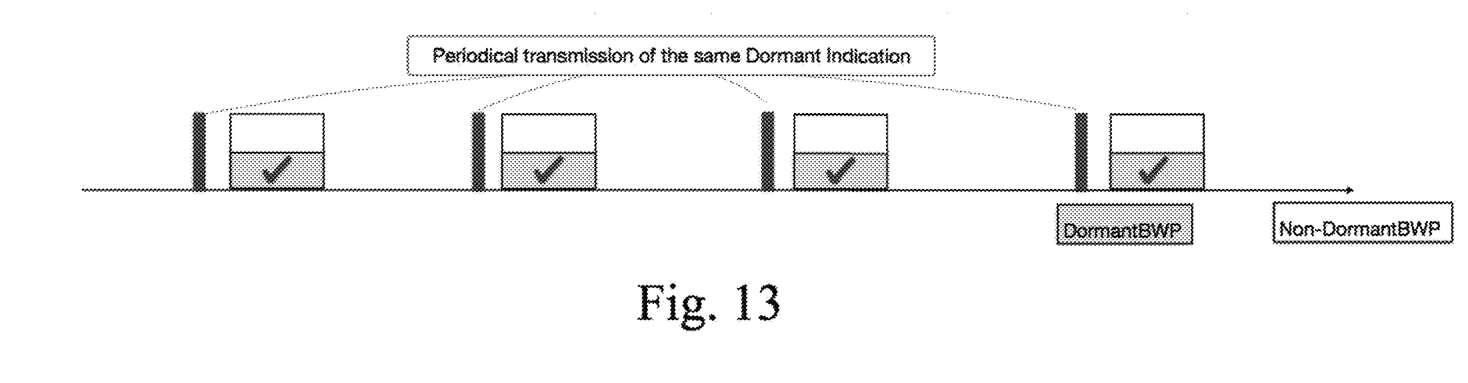
FIG. 13 shows a diagram of the dormancy state switching based on periodic DCI transmission.

In still another embodiment, the network can transmit a same dormancy DCI periodically, and a periodical timer may be used for the transmission based on network implementation, as shown in FIG. 13. FIG. 13 shows a diagram including a same dormant DCI being sent periodically, even when the dormant state is to be maintained. In this manner, the UE continuously receives feedback regarding the state of the SCC.

Figure 14:
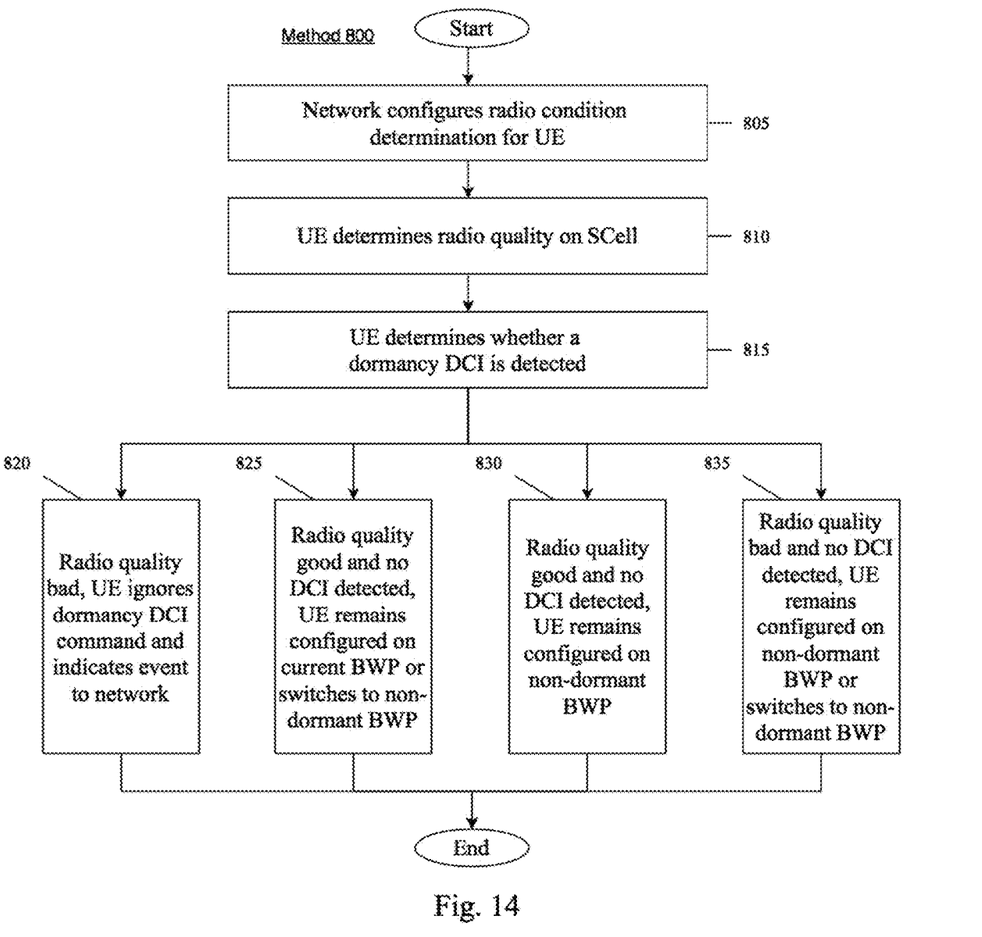
FIG. 14 shows a method for configuring a dormancy state for a UE in a carrier aggregation (CA) configuration with an SCell based on a radio quality determination according to a fourth exemplary embodiment.

FIG. 14 shows a method 800 for configuring a dormancy state for a UE in a carrier aggregation (CA) configuration with an SCell based on a radio quality determination according to a fourth exemplary embodiment. In 805, the network, via a PCell, e.g. gNB 120A configures a radio condition or radio quality threshold value for the UE to determine whether to switch to or from a dormant BWP to or from a non-dormant BWP on a connected SCell, e.g. gNB 120B.

The switching condition may be based on various triggering scenarios. For example, the condition may be based on an L1 CSI measurement, an L1 RSRP measurement, or an L3 RSRP/RSRQ measurement exceeding or failing to meet a predetermined threshold. In another example, the condition may be based on a beam failure detection or an LBT failure detection on the SCell.

Figure 15:
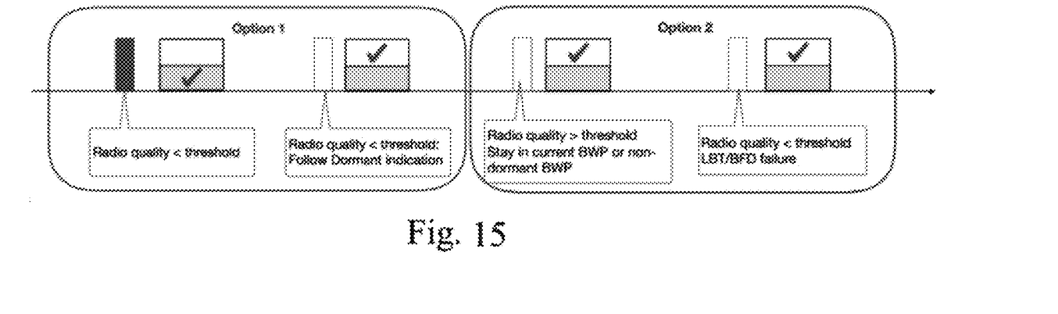
FIG. 15 shows a diagram of the dormancy state switching based on the radio quality determination of FIG. 14.

In 810, the UE determines whether the radio quality is good or bad on the SCell based on whether the switching condition is met. In 815, it is determined whether a dormancy DCI is detected. The following four actions may be taken based on the dormancy DCI detection and the radio quality determination, as shown in FIG. 15.

If, in 820, the UE determines the radio quality is good and that a dormancy DCI is detected, the UE follows the command of the dormancy DCI. If, in 825, the UE determines the radio quality is bad and that a dormancy DCI is detected, the UE remains configured on the currently connected BWP, e.g., ignores the command, and provides an indication to the network.

If, in 830, the dormancy DCI is not detected and the radio quality is good, the UE remains configured on the non-dormant BWP. If, in 835, the dormancy DCI is not detected and the radio quality is bad, the UE will either stay on the non-dormant BWP or switch to the non-dormant BWP.

The exemplary embodiments describe various mechanisms related to switching to/from a dormant BWP on an SCell. These mechanisms may be used in conjunction with currently implemented dormant BWP switching methods, future implementations of BWP switching methods or independently from other BWP switching methods. The exemplary embodiments may apply to any scenario where the UE 110 is configured to connect to an SCell on a dormant BWP.

The following provides examples of operations that are performed on the network side according to the exemplary embodiments described above.

A method is performed by a first next generation evolved node B (gNB) serving as a primary serving cell (PCell) and providing a primary component carrier (PCC) for a user equipment (UE), the UE being further served by a secondary serving cell (SCell) configured to provide either one of a non-dormant bandwidth part (BWP) as a secondary component carrier (SCC) or a dormant BWP as the SCC for the UE. The method includes transmitting, to the UE, a UE configuration for switching from a dormancy state, with the SCell comprising either one of a non-dormant state utilizing the non-dormant BWP as the SCC or a dormant state utilizing the dormant BWP as the SCC, to the other one of the non-dormant state or the dormant state.

The method as described above, wherein, prior to transmitting the UE configuration, the method further includes transmitting a downlink (DL) control indicator (DCI) to the UE to instruct the UE to switch to the other one of the non-dormant BWP or the dormant BWP than currently configured and determining the DCI was mis-detected by the UE, wherein the UE configuration is transmitted based on the determination that the DCI was mis-detected by the UE.

The method as described above, wherein the transmitted UE configuration comprises an explicit configuring of a BWP identifier (ID) corresponding to either one of the non-dormant BWP or the dormant BWP.

The method as described above, wherein the transmitted UE configuration comprises 1 bit indicating the dormancy state of either the non-dormant state or the dormant state.

The method as described above, wherein the transmitted UE configuration comprises a linking of the dormancy state with a discontinuous reception (DRX) onduration state at the UE, wherein the UE enters the dormant BWP during a sleep onduration and enters the non-dormant BWP during a wakeup onduration.

The method as described above, wherein the UE configuration comprises a dormancy timer for a maximum dormant period instructing the UE to enter the dormant state, start the dormancy timer, and, when the UE detects a dormancy DCI signal from the PCell for switching to the non-dormant state within the maximum dormant period, stop the dormancy timer and switch to the non-dormant state.

The method as described above, wherein, when the timer expires prior to the UE detecting a dormancy DCI signal from the PCell for switching to the non-dormant state, the UE switches to the non-dormant state.

The method as described above, wherein, when the timer expires prior to the UE detecting a dormancy DCI signal from the PCell for switching to the non-dormant state, the UE monitors the PDCCH for a scheduling DCI from the SCell.

The method as described above, wherein, when the scheduling DCI is not received during a predetermined period of PDCCH monitoring, the UE restarts the timer and stops PDCCH monitoring, and when the scheduling DCI is received during the predetermined period of PDCCH monitoring, the UE switches to the non-dormant BWP.

The method as described above, wherein the UE configuration comprises an indication that a DCI repetition scheme is to be used where a plurality of dormancy DCIs are sent from the PCell during a predetermined period. The method further includes transmitting the plurality of dormancy DCIs during the predetermined period, wherein, when the UE detects one of the dormancy DCIs during the predetermined period, the UE switches from the current dormancy state based on the dormancy DCI and ignores subsequent dormancy DCIs detected during the predetermined period.

The method as described above, wherein the DCI repetition scheme is dependent on a radio quality determination for the PCC, the DCI transmissions being reduced when the radio quality is determined to be acceptable.

The method as described above, wherein the UE configuration comprises at least one radio condition trigger relating to a radio condition on the SCell that, when detected by the UE, triggers the dormancy state, the at least one radio condition indicating either one of an acceptable radio quality condition or an unacceptable radio quality condition.

The method as described above, wherein the at least one radio condition comprises at least one of a layer 1 (L1) CSI condition, an L1 RSRP condition, a layer 3 (L3) RSRP/RSRQ condition, a beam condition or a listen before talk (LBT) condition.

The method as described above, wherein the UE determines the unacceptable radio quality condition is present when any one of an L1 CSI measurement value fails to satisfy a first predetermined threshold condition, an L1 RSRP measurement value fails to satisfy a second predetermined threshold, an L3 RSRP/RSRQ measurement value fails to satisfy a third predetermined threshold, a beam failure is detected, or an LBT failure is detected.

The method as described above, wherein the UE determines the acceptable radio quality condition is present when the L1 CSI measurement value satisfies the first predetermined threshold condition, the L1 RSRP measurement value satisfies the second predetermined threshold, or the L3 RSRP/RSRQ measurement value satisfies the third predetermined threshold.

The method as described above, wherein the UE enters one of the dormancy states based on the determined acceptable or unacceptable radio quality condition.

The method as described above, wherein the method further includes transmitting a dormancy DCI to the UE, wherein, when the dormancy DCI is detected by the UE, the UE enters one of the dormancy states based on the determined acceptable or unacceptable radio quality condition and the dormancy DCI detection.

The method as described above, wherein the non-dormant state comprises a PDCCH monitoring functionality for the UE and the dormant state does not comprise the PDCCH monitoring functionality for the UE.

The method as described above, wherein the non-dormant state further comprises a transmission of SRSs, a RACH, a PUSCH and a PDSCH functionality for the UE and the dormant state does not comprise the transmission of SRSs, the RACH, the PUSCH and the PDSCH functionality for the UE.

The method as described above, wherein both the non-dormant state and the dormant state comprise a beam management, a CSI measurement and an automatic gain control (AGC) functionality for the UE.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A non-transitory computer readable storage medium comprising a set of instructions, wherein the set of instructions when executed by a processor of a user equipment (UE) cause the processor to perform operations, comprising:
   entering into a first state including one of a non-dormant state or a dormant state with a secondary serving cell (SCell) of a network, the SCell being configured to provide either one of a non-dormant bandwidth part (BWP) as a secondary component carrier (SCC) in the non-dormant state or a dormant BWP as an SCC in the dormant state;
   receiving an indication from the network that a downlink control information (DCI) repetition scheme for dormancy DCI corresponding to the SCell is to be used where a plurality of dormancy DCIs are sent to the network during a predetermined period;
   detecting a dormancy DCI during the predetermined period; and
   switching from the first state to a second state including the other one of the non-dormant state or the dormant state, the switch being based on the dormancy DCI.

2. The non-transitory computer readable storage medium of claim 1, wherein switching from the first state to the second state includes an explicit network configuration of a BWP identifier (ID) corresponding to the non-dormant BWP or the dormant BWP when the UE cannot detect a dormancy DCI sent by the network.

3. The non-transitory computer readable storage medium of claim 1, wherein switching from the first state to the second state includes an explicit network configuration of 1 bit indicating the state when the UE cannot detect a dormancy DCI sent by the network.

4. The non-transitory computer readable storage medium of claim 1, wherein switching from the first state to the second state includes an explicit network configuration linking the state with a discontinuous reception (DRX) onduration state at the UE, the operations further comprising:
   entering the dormant state during a sleep onduration; and
   entering the non-dormant state during a wakeup onduration.

5. The non-transitory computer readable storage medium of claim 1, the operations further comprising:
   indicating to the network a current BWP on which the UE is working when UE cannot detect a dormancy DCI sent by the network.

6. The non-transitory computer readable storage medium of claim 1, wherein a dormancy timer configured by the network includes a maximum dormant period, the operations further comprising:
   starting the dormancy timer when entering the dormant state; and
   when the UE detects a dormancy DCI signal for switching to the non-dormant state, stopping the dormancy timer and switching to the non-dormant state.

7. The non-transitory computer readable storage medium of claim 6, the operations further comprising:
   when the timer expires prior to the UE detecting a dormancy DCI signal for switching to the non-dormant state, switching to the non-dormant state.

8. The non-transitory computer readable storage medium of claim 6, the operations further comprising:
   when the timer expires prior to the UE detecting a dormancy DCI signal for switching to the non-dormant state, monitoring the PDCCH for a scheduling DCI from the SCell.

9. The non-transitory computer readable storage medium of claim 8, the operations further comprising:
   when the scheduling DCI is not received during a predetermined or configured period of PDCCH monitoring, restarting the timer and stopping PDCCH monitoring; and
   when the scheduling DCI is received during the predetermined period of PDCCH monitoring, switching to the non-dormant BWP.

10. The non-transitory computer readable storage medium of claim 1, the operations further comprising:
    receiving a configuration from the network including at least one radio condition trigger relating to the radio condition on the SCell that, when detected by the UE, triggers entering into one of the dormant state or the non-dormant state, the at least one radio condition indicating either one of an acceptable radio quality condition or an unacceptable radio quality condition.

11. The non-transitory computer readable storage medium of claim 10, wherein the at least one radio condition comprises at least one of a layer 1 (L1) CSI condition, an L1

RSRP condition, a layer 3 (L3) RSRP/RSRQ condition, a beam condition or a listen before talk (LBT) condition.

12. The non-transitory computer readable storage medium of claim 11, the operations further comprising:
   determining the unacceptable radio quality condition is present when any one of an L1 CSI measurement value fails to satisfy a first predetermined threshold condition, an L1 RSRP measurement value fails to satisfy a second predetermined threshold, an L3 RSRP/RSRQ measurement value fails to satisfy a third predetermined threshold, a beam failure is detected, or an LBT failure is detected.

13. The non-transitory computer readable storage medium of claim 12, the operations further comprising:
   determining the acceptable radio quality condition is present when the L1 CSI measurement value satisfies the first predetermined threshold condition, the L1 RSRP measurement value satisfies the second predetermined threshold, or the L3 RSRP/RSRQ measurement value satisfies the third predetermined threshold.

14. The non-transitory computer readable storage medium of claim 13, the operations further comprising:
   entering one of the states based on the determined acceptable or unacceptable radio quality condition.

15. The non-transitory computer readable storage medium of claim 13, the operations further comprising:
   detecting a dormancy DCI; and
   entering one of the states based on the determined acceptable or unacceptable radio quality condition and the dormancy DCI detection.

16. The non-transitory computer readable storage medium of claim 1, wherein the non-dormant state includes a PDCCH monitoring functionality and the dormant state does not include the PDCCH monitoring functionality.

17. The non-transitory computer readable storage medium of claim 16, wherein the non-dormant state further includes a transmission of SRSs, a RACH, a PUSCH and a PDSCH functionality and the dormant state does not include the transmission of SRSs, the RACH, the PUSCH and the PDSCH functionality.

18. The non-transitory computer readable storage medium of claim 17, wherein both the non-dormant state and the dormant state includes a beam management, a CSI measurement and an automatic gain control (AGC) functionality.

19. A user equipment (UE), comprising:
   a transceiver configured to be served a secondary component carrier (SCC) by a secondary serving cell (SCell) configured to provide either one of a non-dormant bandwidth part (BWP) as the SCC in a non-dormant state or a dormant BWP as the SCC in a dormant state:
   a processor configured to enter into a first state including one of the dormant state or the non-dormant state, receive an indication from the network that a downlink control information (DCI) repetition scheme for dormancy DCI corresponding to the SCell is to be used where a plurality of dormancy DCIs are sent to the network during a predetermined period, detect a dormancy DCI during the predetermined period and switch from the first state to a second state including the other one of the non-dormant state or the dormant state, the switch being based on the dormancy DCI.

* * * * *